US012700669B2

(12) United States Patent
Chen et al.

(10) Patent No.: US 12,700,669 B2
(45) Date of Patent: Aug. 4, 2026

(54) ADJUSTABLE ANTENNA ARRAY AND ELECTRONIC APPARATUS

(71) Applicants: Beijing BOE Sensor Technology Co., Ltd., Beijing (CN); BOE Technology Group Co., Ltd., Beijing (CN)

(72) Inventors: Lu Chen, Beijing (CN); Xiaoqiang Yang, Beijing (CN); Yiming Wang, Beijing (CN); Zixiang Lin, Beijing (CN); Wei Zhao, Beijing (CN); Cuiwei Tang, Beijing (CN); Zhifeng Zhang, Beijing (CN)

(73) Assignees: Beijing BOE Sensor Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 209 days.

(21) Appl. No.: 18/580,969

(22) PCT Filed: Aug. 26, 2022

(86) PCT No.: PCT/CN2022/115269
§ 371 (c)(1),
(2) Date: Jan. 19, 2024

(87) PCT Pub. No.: WO2024/040606
PCT Pub. Date: Feb. 29, 2024

(65) Prior Publication Data
US 2025/0096460 A1 Mar. 20, 2025

(51) Int. Cl.
*H01Q 3/36* (2006.01)
*H01Q 21/22* (2006.01)

(52) U.S. Cl.
CPC ............... *H01Q 3/36* (2013.01); *H01Q 21/22* (2013.01)

(58) Field of Classification Search
CPC ................................ H01Q 3/36; H01Q 21/22
See application file for complete search history.

(56) References Cited

U.S. PATENT DOCUMENTS 6,147,648 A * 11/2000 Granholm ............ H01Q 21/065 343/700 MS
11,069,976 B1 * 7/2021 Xi ........................ H01Q 21/065
(Continued)

FOREIGN PATENT DOCUMENTS

CN 204348900 U 5/2015
CN 208298996 U 12/2018
(Continued)

*Primary Examiner* — Hai V Tran
(74) *Attorney, Agent, or Firm* — Nath, Goldberg & Meyer; Joshua B. Goldberg

(57) ABSTRACT

An adjustable antenna array and an electronic apparatus are provided. The adjustable antenna array includes: a first substrate and a second substrate opposite to each other, and antenna sub-arrays in an array. Each of at least some antenna sub-arrays includes a phase shifter, a power division feeding network, and a plurality of radiating units. The phase shifter and the power division feeding network are between the first substrate and the second substrate. At least some radiating units are connected to the phase shifter through the power division feeding network. Antenna patterns corresponding to the plurality of radiating units at least include patterns on a side of the second substrate away from the first substrate. An area of an orthographic projection of the power division feeding network on the first substrate is smaller than an area of an orthographic projection of the phase shifter on the first substrate.

19 Claims, 14 Drawing Sheets

(56) References Cited

U.S. PATENT DOCUMENTS

| | | | | |
|---|---|---|---|---|
| 2013/0214973 | A1* | 8/2013 | Veihl | H01Q 3/40 333/2 |
| 2015/0357721 | A1* | 12/2015 | Zimmerman | H01Q 21/0006 343/853 |
| 2017/0279197 | A1* | 9/2017 | Sharawi | H01Q 3/40 |
| 2020/0243969 | A1 | 7/2020 | Fang et al. | |
| 2022/0102873 | A1* | 3/2022 | Wang | H01P 5/19 |
| 2023/0163481 | A1* | 5/2023 | Jia | H01Q 21/0075 343/893 |
| 2024/0243473 | A1* | 7/2024 | Lee | H01Q 9/0414 |

FOREIGN PATENT DOCUMENTS

| | | | |
|---|---|---|---|
| CN | 110661101 | A | 1/2020 |
| CN | 112186340 | A | 1/2021 |
| CN | 113594669 | A | 11/2021 |
| CN | 114079159 | A | 2/2022 |
| CN | 114267934 | A | 4/2022 |
| WO | 2017/031980 | A1 | 3/2017 |
| WO | 2022/120856 | A1 | 6/2022 |
| WO | 2022/170497 | A1 | 8/2022 |

* cited by examiner

ADJUSTABLE ANTENNA ARRAY AND ELECTRONIC APPARATUS

This is a National Phase Application filed under 35 U.S.C. 371 as a national stage of PCT/CN2022/115269, filed Aug. 26, 2022, the content of which is hereby incorporated by reference in its entirety.

TECHNICAL FIELD

The present disclosure relates to the field of communication technology, and in particular to an adjustable antenna array and an electronic apparatus.

BACKGROUND

In a design for a dual-polarized or multi-polarized antenna array, multiple polarization modes may be simultaneously implemented in one antenna unit. A dual-polarized antenna based on two polarization modes is capable of simultaneously transmitting two orthogonally polarized electromagnetic wave signals with a small interference therebetween, and is suitable for duplex operation, and thus, gradually becomes an indispensable component in a wireless communication system, and influences the performance of the communication system.

In the actual design for a dual-polarized liquid crystal antenna unit and array, the number of phase shifters corresponding to the antenna units is multiplied with multiplication of the polarization modes, which causes the problem of an insufficient space for placing devices and greatly increases the complexity of design layout. Furthermore, the corresponding multiplication of control lines and driving circuits also increases the complexity of a control system. Many problems caused by the above are urgently required to be solved.

SUMMARY

The present disclosure provides an adjustable antenna array and an electronic apparatus as below.

An embodiment of the present disclosure provides an adjustable antenna array, including: a first substrate and a second substrate opposite to each other, and a plurality of antenna sub-arrays in an array; wherein each of at least some of the plurality of antenna sub-arrays includes a phase shifter, a power division feeding network, and a plurality of radiating units, the phase shifter and the power division feeding network are between the first substrate and the second substrate, at least some of the plurality of radiating units are connected to the phase shifter through the power division feeding network, antenna patterns corresponding to the plurality of radiating units at least include patterns on a side of the second substrate away from the first substrate, and an area of an orthographic projection of the power division feeding network on the first substrate is smaller than an area of an orthographic projection of the phase shifter on the first substrate.

Optionally, in the embodiments of the present disclosure, an input port of the power division feeding network is connected to the phase shifter, and a plurality of output ports of the power division feeding network are in one-to-one correspondence with the corresponding radiating units.

Optionally, in the embodiments of the present disclosure, the adjustable antenna array includes three or more radiating units, two or more power division feeding networks, and the number of output ports of the two or more power division feeding networks is less than the number of plurality of radiating units.

Optionally, in the embodiments of the present disclosure, the plurality of output ports in each power division feeding network have the same line length and the same line width.

Optionally, in the embodiments of the present disclosure, the number of output ports of each power division feeding network is constant.

Optionally, in the embodiments of the present disclosure, the two or more power division feeding networks include a first-stage power division feeding network and a second-stage power division feeding network, output ports of the first-stage power division feeding network are connected to the plurality of radiating units, an input port of the first-stage power division feeding network is connected to one output port of the second-stage power division feeding network, and an input port of the second-stage power division feeding network is connected to the phase shifter.

Optionally, in the embodiments of the present disclosure, the first-stage power division feeding network includes two output ports and the second-stage power division feeding network includes two output ports.

Optionally, in the embodiments of the present disclosure, the number of the plurality of radiating units is even-numbered, and every two radiating units are respectively connected to the output ports of one corresponding first-stage power division feeding network.

Optionally, in the embodiments of the present disclosure, the adjustable antenna array includes four radiating units, two first-stage power division feeding networks, and one second-stage power division feeding network; wherein the first two adjacent radiating units are respectively connected to the output ports of one first-stage power division feeding network, and the other two adjacent radiating units are respectively connected to the output ports of the other first-stage power division feeding network, and the input ports of the two first-stage power division feeding networks are respectively connected to the output ports of the second-stage power division feeding network.

Optionally, in the embodiments of the present disclosure, the adjustable antenna array includes four radiating units, one first-stage power division feeding network, and one second-stage power division feeding network; wherein the first two adjacent radiating units are respectively connected to the output ports of the first-stage power division feeding network, the input port of the first-stage power division feeding network and one of the other two radiating units are connected to the output ports of the second-stage power division feeding network, and the other one of the other two radiating units is directly connected to the other phase shifter.

Optionally, in the embodiments of the present disclosure, the number of the plurality of radiating units is odd-numbered, each pair of two radiating units are respectively connected to the output ports of one corresponding first-stage power division feeding network, and the remaining radiating unit is connected to one output port of one corresponding second-stage power division feeding network.

Optionally, in the embodiments of the present disclosure, the adjustable antenna array includes three radiating units, one first-stage power division feeding network, and one second-stage power division feeding network, wherein the first two adjacent radiating units are connected to the output ports of the first-stage power division feeding network, and the input port of the first-stage power division feeding network and the remaining radiating unit are connected to the output ports of the second-stage power division feeding network.

Optionally, in the embodiments of the present disclosure, the plurality of radiating units are arranged side-by-side.

Optionally, in the embodiments of the present disclosure, the plurality of radiating units are arranged in an array.

Optionally, in the embodiments of the present disclosure, the plurality of radiating units are single-polarized structures with the same polarization direction, and each single-polarized structure includes any one of vertical polarization, horizontal polarization, +45° polarization, −45° polarization, right-hand circular polarization and left-hand circular polarization.

Optionally, in the embodiments of the present disclosure, each radiating unit is a dual-polarization structure having two different polarization directions, and the dual-polarization structure includes any one of vertical-horizontal dual-polarization, ±45° dual-polarization, and left-right circular dual-polarization.

Optionally, in the embodiments of the present disclosure, the plurality of radiating units includes a first radiating unit and a second radiating unit, the power division feeding network includes a first power division feeding network and a second power division feeding network, the phase shifter includes a first phase shifter and a second phase shifter, output ports of the first power division feeding network are connected to the first radiating unit and the second radiating unit, respectively, an input port of the first power division feeding network is connected to the first phase shifter through a first feeding line, output ports of the second power division feeding network are connected to the first radiating unit and the second radiating unit, respectively, and an input port of the second power division feeding network is connected to the second phase shifter through a second feeding line.

Optionally, in the embodiments of the present disclosure, the first phase shifter, the first feeding line, the first power division feeding network, the second phase shifter, the second feeding line, and the second power division feeding network are formed by patterns of metal layers on the same substrate in the same layer and having the same thickness.

Optionally, in the embodiments of the present disclosure, the antenna array further includes a ground electrode on a side of the first substrate away from the second substrate, and an orthographic projection of each radiating unit on the first substrate completely falls within an orthographic projection of the ground electrode on the first substrate, so that an electromagnetic wave signal received by the adjustable antenna array on a side of the second substrate away from the first substrate is reflected from the same side of the second substrate away from the first substrate by the ground electrode.

Optionally, in the embodiments of the present disclosure, the antenna patterns further include another pattern on a side of the first substrate away from the second substrate, and orthographic projections of the another pattern and the pattern on the first substrate at least partially overlap with each other, so that an electromagnetic wave signal received by the adjustable antenna array on a side of the second substrate away from the first substrate is transmitted through a side of the first substrate away from the second substrate.

Accordingly, an embodiment of the present disclosure provides an electronic apparatus, including: the adjustable antenna array of any one of the embodiments.

DETAIL DESCRIPTION OF EMBODIMENTS

To make the objects, technical solutions and advantages of the embodiments of the present disclosure more apparent, the technical solutions of the embodiments of the present disclosure will be clearly and completely described below with reference to the drawings of the embodiments of the present disclosure. It is to be understood that the described embodiments are only a few, not all of, embodiments of the present disclosure. Embodiments of the present disclosure and features of the embodiments may be combined with each other in case of no conflict. All other embodiments, which can be derived by a person skilled in the art from the embodiments of the present disclosure without any creative effort, are within the protective scope of the present disclosure.

Unless defined otherwise, technical or scientific terms used herein shall have the ordinary meaning as understood by one of ordinary skill in the art to which the present disclosure belongs. The term "comprising", "including", or the like used herein means that the element or item preceding the term contains the element or item listed after the term and its equivalent, but does not exclude other elements or items.

Figure 1:
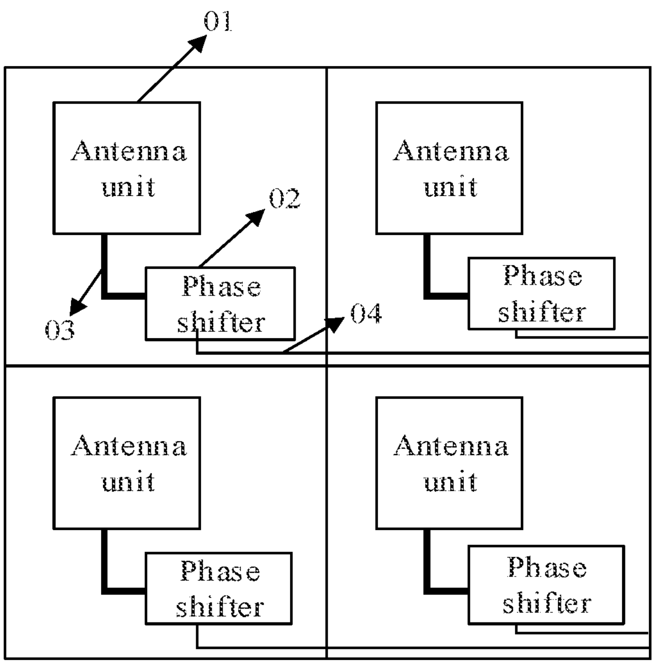
FIG. 1 is a schematic top view of a structure of a 2×2 antenna array formed by four antenna units in the related art.
Figure 2:
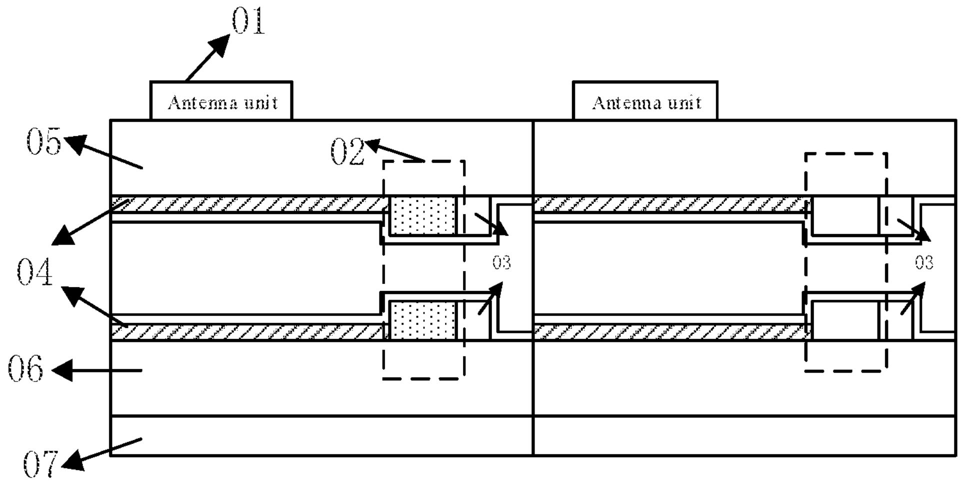
FIG. 2 is a schematic cross-sectional view of the structure of FIG. 1.

FIG. 1 is a schematic top view of a structure of a 2×2 antenna array formed by four antenna units in the related art. Each antenna unit 01 has a size of a×b, a=0.25λ,b=0.25λ, and λ is a wavelength corresponding to a central operating frequency point of the corresponding antenna array. A lateral interval and a longitudinal interval of the antenna units 01 are both 0.5λ. Each antenna unit 01 corresponds to one phase shifter 02, and is coupled to the corresponding phase shifter 02 through a feeding line 03, so that the phase shifters 02 drive the antenna units 01 in a one-to-one correspondence manner. Each phase shifter 02 is necessarily coupled to a control line 04 so that the phase shifter 02 is driven and controlled. FIG. 2 is a schematic cross-sectional view of the structure of FIG. 1. A reference number 05 denotes an upper substrate, a reference number 06 denotes a lower substrate, and a reference number 07 denotes a ground substrate. In the actual layout, in combination with FIG. 1, in the 2×2 antenna array, in consideration of the lateral interval and the longitudinal interval of the antenna units 01, four phase shifters 02, four groups of feeding lines 03, and four groups of control lines 04 are arranged in the space of λ×λ. Especially when the size of each phase shifter 02 is large, which brings a challenge for the design of the antenna units 01 and the arrangement layout of the array, it is necessary to consider the high performance connection between the antenna unit 01 and the phase shifter 02, the influence on the performance between the feeding line 03 and the phase shifter 02 and a layout of the control lines 04 and the like, so that the design is limited. The difficulty becomes even greater as the array size is further increased.

In view of this, the present disclosure provides an adjustable antenna array and an electronic apparatus, which can save space for the layout.

Figure 3:
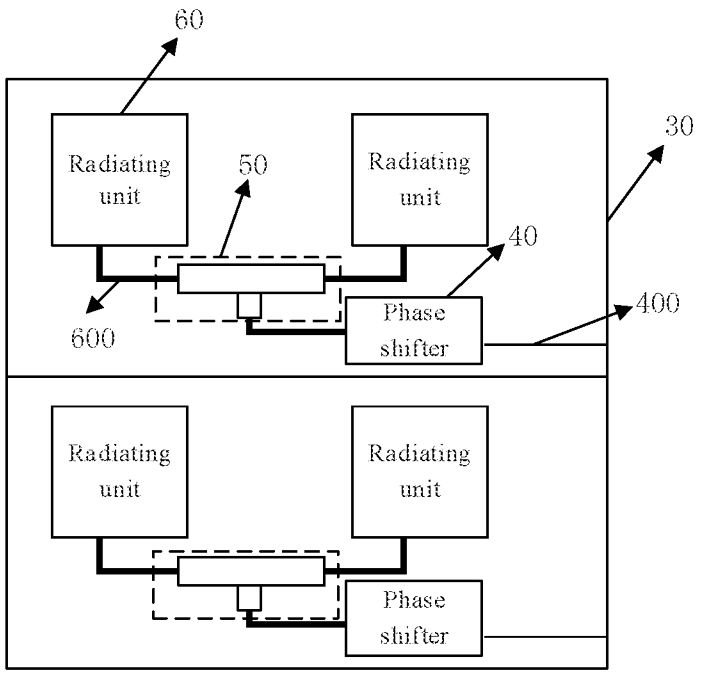
FIG. 3 is a schematic top view of a structure of an adjustable antenna array according to an embodiment of the present disclosure.
Figure 4:
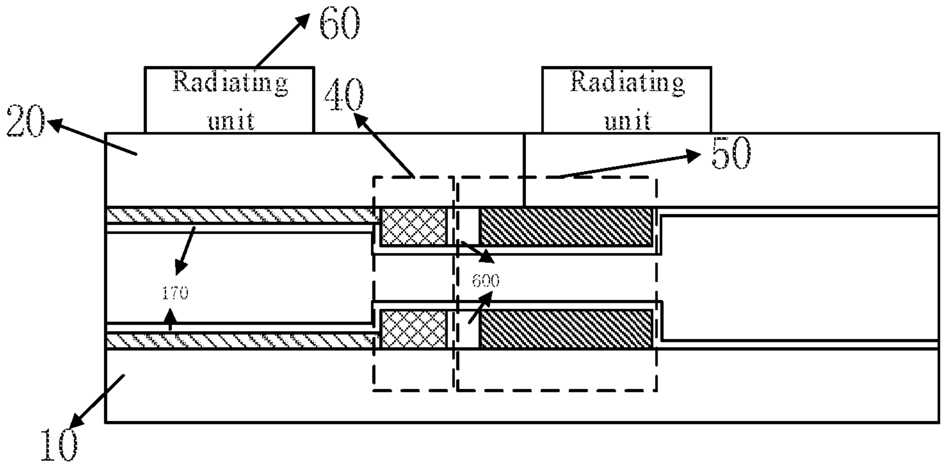
FIG. 4 is a schematic cross-sectional view of the structure of FIG. 3.

As shown in FIGS. 3 and 4, an embodiment of the present disclosure provides an adjustable antenna array. FIG. 3 is a schematic top view of a structure of the adjustable antenna array. FIG. 4 is a schematic cross-sectional view of the structure of FIG. 3. Specifically, the adjustable antenna array includes:

A first substrate 10 and a second substrate 20 arranged oppositely, and a plurality of antenna sub-arrays 30 in an array;

Each of at least some of the plurality of antenna sub-arrays 30 includes a phase shifter 40, a power division feeding network 50, and a plurality of radiating units 60. The phase shifter 40 and the power division feeding network 50 are located between the first substrate 10 and the second substrate 20. At least some of the plurality of radiating units 60 are connected to the phase shifter 40 through the power division feeding network 50. Antenna patterns corresponding to the plurality of radiating units 60 at least include patterns located on a side of the second substrate 20 away from the first substrate 10, and an area of an orthographic projection of the power division feeding network 50 on the first substrate 10 is smaller than an area of an orthographic projection of the phase shifter 40 on the first substrate 10.

In a specific implementation, the adjustable antenna array includes the first substrate 10 and the second substrate 20 opposite to each other, and the plurality of antenna sub-arrays 30 arranged in an array. Each of the first substrate 10 and the second substrate 20 may be a glass substrate, polyimide (PI), liquid crystal polymer (LCP), a printed circuit board (PCB), or a ceramic, or the like. Alternatively, the first substrate 10 and the second substrate 20 may be disposed according to practical requirements, which is not limited herein. In addition, the specific number of the plurality of antenna sub-arrays 30 may be set according to the practical requirements, which is not limited herein.

Each of at least some of the plurality of antenna sub-arrays 30 includes the phase shifter 40, the power division feeding network 50, and the plurality of radiating units 60. Each antenna sub-array 30 may include one or more phase shifters 40 and one or more power division feeding networks 50. The specific number of the phase shifters 40 and the power division feeding network 50 may be set according to the specific number of the plurality of radiating units 60 in each actual antenna sub-array 30, which is not limited herein. FIG. 3 illustrates that the adjustable antenna array includes two antenna sub-arrays 30 arranged in an array, where each antenna sub-array 30 includes two radiating units 60, one power division feeding network 50 and one phase shifter 40, but which is not limited thereto. The phase shifter 40 and the power division feeding network 50 are located between the first substrate 10 and the second substrate 20, and at least some of the radiating units 60 in the plurality of radiating units 60 are connected to the phase shifter 40 through the power division feeding network 50. The power division feeding network 50 may divide a signal input therein through the phase shifter 40 into signals in paths and provide the signals in the paths to the corresponding radiating units 60, so that even if the number of the radiating units is great and constant, the number of the phase shifters 40 can be reduced to some extent. Furthermore, the area of the orthographic projection of the power division feeding network 50 on the first substrate 10 is smaller than the area of the orthographic projection of the phase shifter 40 on the first substrate 10. That is, despite the addition of the power division feeding network 50 in the adjustable antenna array, the power division feeding network 50 may be designed to be much smaller in size than the single phase shifter 40. In this way, the layout space of the adjustable antenna array is effectively saved while the number of the phase shifters 40 is reduced.

It should be noted that, the power division feeding network 50 is substantially a part of the feeding line of the adjustable antenna array except for the phase shifters 40. Accordingly, the area of the orthographic projection of the power division feeding network 50 on the first substrate 10 is substantially an area of a cross-sectional shape of the part of the feeding line in parallel to a plane where the first substrate 10 is located. A width of the cross-sectional shape of the part of the feeding line is much smaller than a width of a cross-sectional shape of the phase shifter 40 in parallel to the plane where the first substrate 10 is located, and the area of the orthographic projection of the cross-sectional shape of the part of the feeding line on the first substrate 10 is much smaller than an area of an orthographic projection of the phase shifter 40 on the first substrate 10.

It should be noted that FIG. 4 simply illustrates a positional relationship among the devices in the adjustable antenna array. The sizes and shapes of various elements shown in the drawings referred to in the embodiments of the present disclosure are not necessarily drawn to scale and are merely for illustrating the present disclosure. Like or similar reference numerals refer to like or similar elements or elements having like or similar functions throughout.

Figure 5:
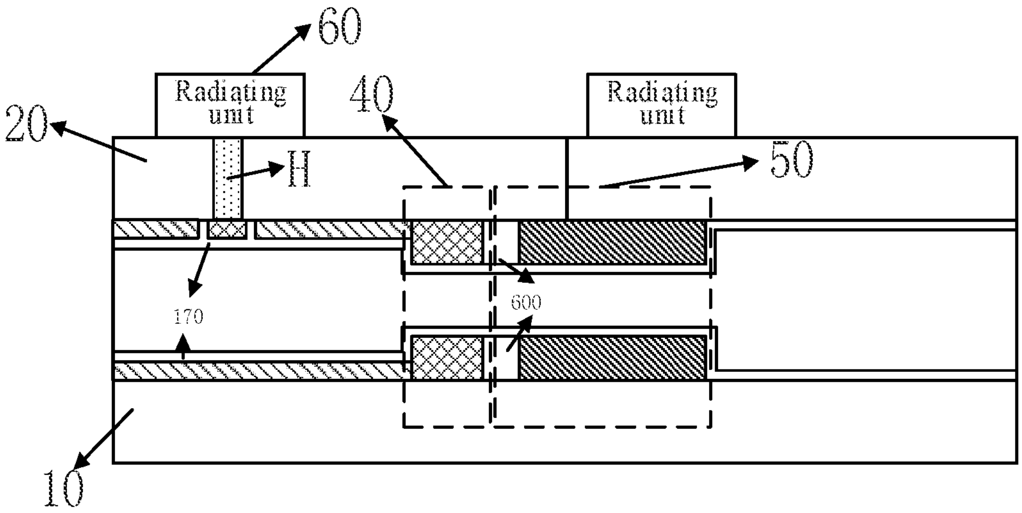
FIG. 5 is a schematic cross-sectional view of the structure of FIG. 3.

In one exemplary embodiment, an orthographic projection of at least some radiating units 60 on the first substrate 10 and an orthographic projection of an output port of the power division feeding network 50 connected to the at least some radiating units 60 on the first substrate 10 at least partially overlap with each other. In one exemplary embodiment, as shown in FIG. 5, the output port of the power division feeding network 50 may be directly electrically connected to at least some radiating units 60 through a via (H) (a through glass via (TGV)) penetrating through the corresponding substrate. In one exemplary embodiment, the output port of the power division feeding network 50 may be coupled to the at least some radiating units 60. Alternatively, the connection between the power division feeding network 50 and the at least some radiating units 60 may also be set according to the practical requirements, which is not limited herein.

In a specific implementation, the antenna patterns corresponding to the plurality of radiating units 60 at least include the patterns located on a side of the second substrate 20 away from the first substrate 10. In one exemplary embodiment, as shown in FIG. 3, the antenna patterns corresponding to the plurality of radiating units 60 at least include the patterns located on a side of the second substrate 20 away from the first substrate 10. In one exemplary embodiment, the antenna patterns corresponding to the plurality of radiating units 60 at least include not only the patterns located on a side of the second substrate 20 away from the first substrate 10, but also patterns located on a side of the first substrate 10 away from the second substrate 20, so as to improve a radiation range of the respective antenna sub-arrays 30.

It should be noted that, the position relationship between the elements in each antenna sub-array 30 in the adjustable antenna array may be as shown in the following several cases.

In a specific implementation, when each antenna sub-array 30 includes Q radiating units 60, each of the number of phase shifters 40 in the antenna sub-array 30 and the number of control lines 400 connected to the phase shifters 40 may be reduced to I/Q of the original number, where Q is a positive integer greater than 1. The positional relationship of the units in each antenna sub-array 30 and the applicable scenario are described below by taking an example in which each radiating unit 60 has a size of a×b, a=0.25λ, b=0.25λ, and λ is a wavelength corresponding to a central operating frequency point of the adjustable antenna array, and a lateral interval and a longitudinal interval between any two adjacent radiating units 60 are both 0.5λ.

For example, each antenna sub-array 30 includes m radiating units 60 arranged longitudinally, where m is a positive integer greater than 1. In this case, a distance between any two adjacent antenna sub-arrays 30 in the longitudinal direction may be m×0.5×λ. If feeding signals of the radiating units 60 are kept consistent, a scanning angle of the adjustable antenna array in the longitudinal direction is less than that in a case of one radiating unit 60 in each sub-array shown in FIG. 1. Accordingly, the adjustable antenna array may be applied to an electronic apparatus with low requirements on the longitudinal scanning performance.

For another example, each antenna sub-array 30 includes n radiating units 60 arranged laterally, where n is a positive integer greater than 1. In this case, a distance between any two adjacent antenna sub-arrays 30 in the lateral direction may be n×0.5×λ. If the feeding signals of the radiating units 60 are kept consistent, a scanning angle of the adjustable antenna array in the lateral direction is less than that in a case of one radiating unit 60 in each sub-array shown in FIG. 1. Accordingly, the adjustable antenna array may be applied to an electronic apparatus with lower requirements on the lateral scanning performance.

For another example, when the Q radiating units 60 in each antenna sub-array 30 are not arranged in an m×n array, if the feeding signals of the radiating units 60 are kept consistent, the feeding signals of the units of different sub-arrays may have a specific performance difference, which can ensure a specific product performance corresponding to the adjustable antenna array.

For another example, one power division feeding network 50 corresponding to the Q radiating units 60 in each antenna sub-array 30 may be formed by a 1-to-Q power division feeding network and the feeding lines 600, where the 1-to-Q power division feeding network may be formed by a plurality of 1-to-2 power division feeding networks sequentially connected together, and the 1-to-2 power division feeding networks which are asymmetric with respect to each other may have different line widths and different line lengths according to the design requirement for the impedance matching of the corresponding power division feeding network 50.

In the embodiment of the present disclosure, each antenna sub-array 30 in the adjustable antenna array may have various forms of the arrangement and driving manner, which is mainly embodied in the number of the radiating units 60 in each antenna sub-array 30, and the connection relationship and the position relationship among the units in each antenna sub-array 30. In one exemplary embodiment, an input port 501 of the power division feeding network 50 is connected to the phase shifter 40, and output ports 502 of the power division feeding network 50 are in one-to-one correspondence with the corresponding radiating units 60.

In a specific implementation, the input port 501 of the power division feeding network 50 may be electrically connected or coupled to the phase shifter 40, which is not limited herein. In one exemplary embodiment, the plurality of output ports 502 of the power division feeding network 50 may be in one-to-one correspondence with the corresponding radiating units 60. Accordingly, the number of the plurality of output ports 502 is equal to the number of the plurality of radiating units 60.

Figure 6:
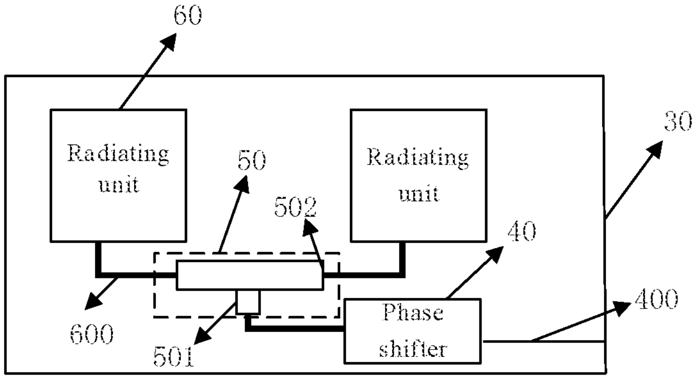
FIG. 6 is a schematic top view of a structure of an antenna sub-array of an adjustable antenna array according to an embodiment of the present disclosure.

In one exemplary embodiment, FIG. 6 is a schematic top view of a structure of an antenna sub-array 30 in the adjustable antenna array. As shown in FIG. 6, each antenna sub-array 30 includes two radiating units 60, one power division feeding network 50 including two output ports 502, and one phase shifter 40. The power division feeding network 50 includes two output ports 502 connected to the two radiating units 60, so that a signal input to the input port 501 of the power division feeding network 50 through the phase shifter 40 is output as signals in two paths through the two output ports 502, which may be provided to the corresponding radiating units 60 respectively. In addition, the number of the plurality of output ports 502 may also be set according to the specific number of the plurality of radiating units 60 in practical application. For example, three radiating units 60 are connected to three output ports 502 of the power division feeding network 50. For another example, four radiating units 60 are connected to four output ports 502 of the power division feeding network 50. Next, a case as shown in FIG. 3 as an example will be described where the plurality of output ports 502 of the power division feeding network 50 are in one-to-one correspondence with the corresponding radiating units 60. The adjustable antenna array shown in FIG. 3 is substantially a 2×2 array of four radiating units 60. Only two phase shifters 40 are provided in the array. Compared with FIG. 1, when the size of each antenna unit is the same as that of each radiating unit 60 and the size of each phase shifter 40 in FIG. 1 is the same as that of each phase shifter 40 in FIG. 3, the number of the phase shifters 40 is reduced by half, and thus, the number of control lines 400 connected to the phase shifters 40 is reduced by half, thereby saving layout space.

Figure 7:
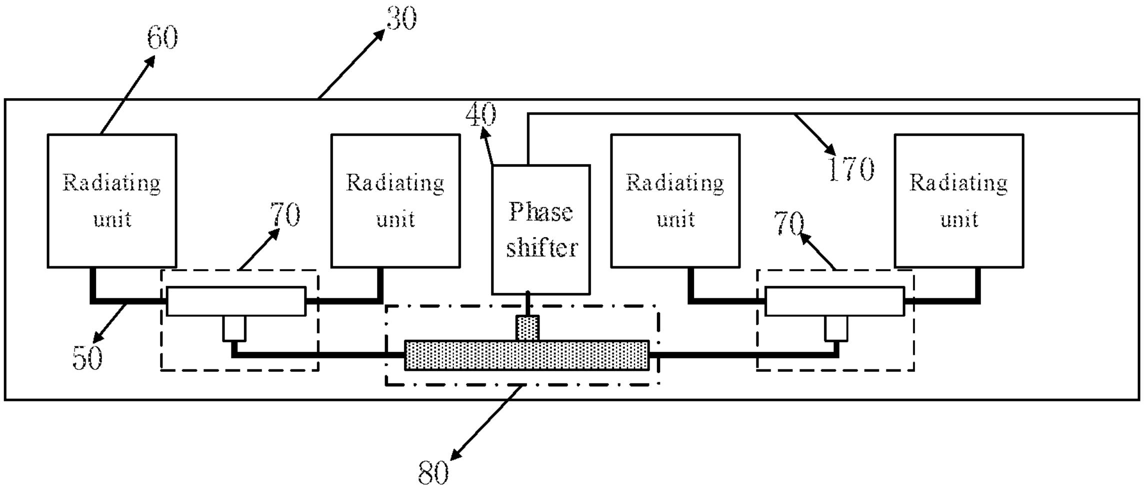
FIG. 7 is a schematic top view of a structure of an antenna sub-array of an adjustable antenna array according to an embodiment of the present disclosure.
Figure 8:
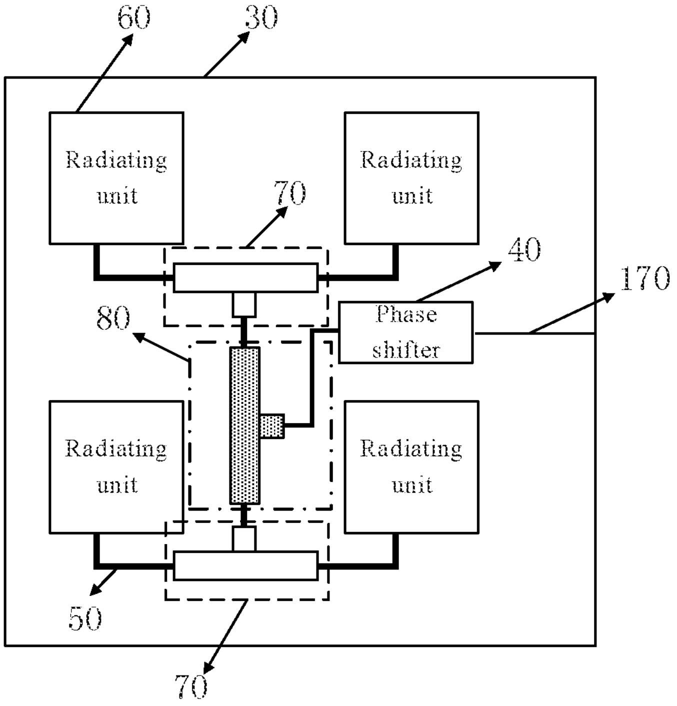
FIG. 8 is a schematic top view of a structure of an antenna sub-array of an adjustable antenna array according to an embodiment of the present disclosure.
Figure 9:
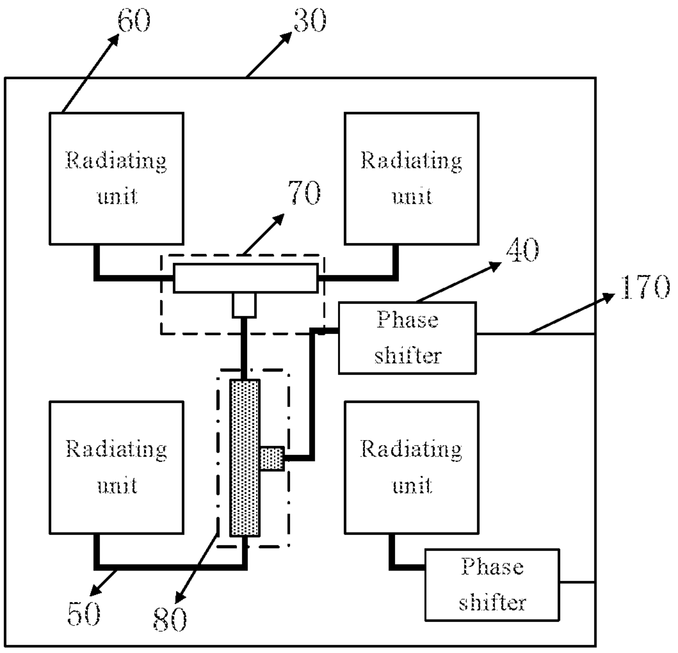
FIG. 9 is a schematic top view of a structure of an antenna sub-array of an adjustable antenna array according to an embodiment of the present disclosure.

In one exemplary embodiment, as shown in FIGS. 7 to 9, the number of the plurality of radiating units 60 is not less than three, the number of the power division feeding networks 50 is not less than two, and the number of the output ports 502 of each power division feeding network 50 is less than the number of the plurality of radiating units 60.

In a specific implementation, the number of the plurality of radiating units 60 may be three or more. The number of the plurality of radiating units 60 may be set according to the practical requirements, which is not limited herein. The number of the power division feeding networks 50 is not less than two, the number of the power division feeding networks 50 may be two or more. The number of the power division feeding networks 50 may be set according to the practical requirements, which is not limited herein. The number of output ports 502 of each power division feeding network 50 is smaller than the number of radiating units 60. In one exemplary embodiment, the number of the output ports 502 of each power division feeding network 50 are two, and the number of the plurality of radiating units 60 is three. In one exemplary embodiment, each of some power division feeding networks 50 includes two output ports 502, and each of the other power division feeding networks 50 includes three output ports 502, the number of radiating units 60 is five. Alternatively, the number of the output ports 502 of each power division feeding network 50 may be set according to the performance requirement of the adjustable antenna array, which is not limited herein.

In the embodiment of the present disclosure, as shown in FIG. 3 to FIG. 10, the output ports 502 in each power division feeding network 50 have the same line length and the same line width. In this way, it can be ensured that the physical structure of the power division feeding networks 50 and the electrical performance of the output ports 502 can be kept consistent, and the equivalent driving of the corresponding radiating units 60 by the output ports 502 can be realized.

In the embodiment of the present disclosure, as shown in FIG. 3 to FIG. 10, the power division feeding networks 50 have the same number of the output ports 502. For example, each power division feeding network 50 has two output ports 502. For another example, each power division feeding network 50 has three output ports 502. The specific number of the output ports 502 of each power division feeding network 50 may be set according to the practical requirements, which is not limited herein.

In the embodiment of the present disclosure, as shown in FIG. 3 to FIG. 10, the power division feeding network 50 includes a first-stage power division feeding network 70 and a second-stage power division feeding network 80, output ports 502 of the first-stage power division feeding network 70 are connected to the radiating units 60, an input port 501 of the first-stage power division feeding network 70 is connected to one output port 502 of the second-stage power division feeding network 80, and an input port 501 of the second-stage power division feeding network 80 is connected to the phase shifter 40.

In a specific implementation, the power division feeding network 50 may include the first-stage power division feeding network 70 and the second-stage power division feeding network 80. The number of the first-stage power division feeding networks 70 may be one or more. The number of the second-stage power division feeding networks 80 may be one or more. The specific number of the first-stage power division feeding networks 70 and the specific number of the second-stage power division feeding networks 80 may be set according to the practical requirements, which is not limited herein. Furthermore, the output ports 502 of the first-stage power division feeding network 70 are connected to the plurality of radiating units 60, an input port 501 of the first-stage power division feeding network 70 is connected to one output port 502 of the second-stage power division feeding network 80, and an input port 501 of the second-stage power division feeding network 80 is connected to the phase shifter 40. In one exemplary embodiment, the first-stage power division feeding network 70 and the second-stage power division feeding network 80 may be electrically connected or coupled to each other. In addition, the second-stage power division feeding network and the phase shifter 40 may be electrically connected or coupled to each other, which is not limited herein. In this way, a signal input to the input port 501 of the second-stage power division feeding network 80 through the phase shifter 40 is output as signals in paths through the output ports 502 of the second-stage power division feeding network 80, which in turn input to the input port 501 of the first-stage power division feeding network 70 and output to the corresponding radiating units 60 as signals in paths through the output ports 502 of the first-stage power division feeding network 70. In this way, the driving of radiating units 60 and the usability of the adjustable antenna array are ensured.

In one exemplary embodiment, as shown in FIGS. 3 to 10, the number of the output ports 502 of the first-stage power division feeding network 70 is two and the number of the output ports 502 of the second-stage power division feeding network 80 is two. Correspondingly, the first-stage power division feeding network 70 and the second-stage power division feeding network 80 are both a one-driving-two power division feeding network.

As shown in FIG. 7 to FIG. 9, the number of the plurality of radiating units 60 is even number, and every two radiating units 60 are respectively connected to the output ports 502 of one first-stage power division feeding network 70.

With reference to FIG. 7 and FIG. 8, the number of the radiating units 60 is four, the number of the first-stage power division feeding networks 70 is two, the number of the second-stage power division feeding network 80 is one. The first two adjacent radiating units 60 are respectively connected to the output ports 502 of one first-stage power division feeding network 70, and the other two adjacent radiating units 60 are respectively connected to the output ports 502 of the other first-stage power division feeding network 70, and the input ports 501 of the two first-stage power division feeding networks 70 are respectively connected to the output ports 502 of the second-stage power division feeding network 80.

Still referring to FIG. 7, the sub-array is provided with four radiating units 60, two first-stage power division feeding networks 70, one second-stage power division feeding network 80 and one phase shifter 40. The four radiating units 60 are arranged laterally in the same direction. The first two adjacent radiating units 60 are connected to the output ports 502 of one first-stage power division feeding network 70, and the other two adjacent radiating units 60 are connected to the output ports 502 of the other first-stage power division feeding network 70. In the specific implementation, the output ports 502 in the first-stage power division feeding networks 70 have the same line length and the same line width, so that the consistency of the electrical performance of each output port 502 is ensured, and the usability of the adjustable antenna array is improved. In addition, the input ports 501 of the two first-stage power division feeding networks 70 are respectively connected to the output ports 502 of the second-stage power division feeding network 80. In one exemplary embodiment, the input ports 501 of the two first-stage power division feeding networks 70 may be electrically connected to the output ports 502 of the second-stage power division feeding network 80, respectively; in one exemplary embodiment, the input ports 501 of the two first-stage power division feeding networks 70 may be electrically coupled to the output ports 502 of the second-stage power division feeding network 80, respectively. The output ports 502 in the second-stage power division feeding network 80 have the same line length and the same line width, so that the consistency of the electrical performance of each output port 502 is ensured, and the usability of the adjustable antenna array is improved.

Still referring to FIG. 8, the sub-array is provided with four radiating units 60, two first-stage power division feeding networks 70, one second-stage power division feeding network 80 and one phase shifter 40. The four radiating units 60 are arranged in a 2×2 array. With reference to FIG. 9, the sub-array is provided with four radiating units 60, one first-stage power division feeding networks 70 and one second-stage power division feeding network 80. The first two adjacent radiating units 60 are respectively connected to the output ports 502 of the first-stage power division feeding network 70, the input port 501 of the first-stage power division feeding network 70 and one of the other two radiating units 60 are connected to the output ports 502 of the second-stage power division feeding network 80, and the other one of the other two radiating units 60 is directly connected to the other phase shifter 40.

Still referring to FIG. 9, the sub-array is provided with four radiating units 60, one first-stage power division feeding network 70, one second-stage power division feeding network 80 and two phase shifters 40. The four radiating units 60 are arranged in a 2×2 array. The first two adjacent radiating units 60 are respectively connected to the output ports 502 of the first-stage power division feeding network 70, the input port 501 of the first-stage power division feeding network 70 and one of the other two radiating units 60 are connected to the output ports 502 of the second-stage power division feeding network 80. In one exemplary embodiment, the input port 501 of the first-stage power division feeding network 70 may be electrically connected to one output port of the second-stage power division feeding network, and one of the other two radiating units 60 is coupled to the other output port 502 of the second-stage power division feeding network 80. In this way, a signal input to the input port 501 of the second-stage power division feeding network 80 through one phase shifter 40 is input to the input port 501 of the first-stage power division feeding network 70 and the corresponding radiating unit 60 through the two output ports 502 of the second-stage power division feeding network 80; then, the signal input to the input port 501 of the first-stage power division feeding network 70 is input to the corresponding radiating units 60 through the two output ports 502 of the first-stage power division feeding network 70; the radiating unit 60 directly coupled to the other phase shifter 40 may directly receive a signal from the other phase shifter. Therefore, the layout space is saved and the flexible design of the sub-array structure is guaranteed, and the usability of the adjustable antenna array is improved.

Figure 10:
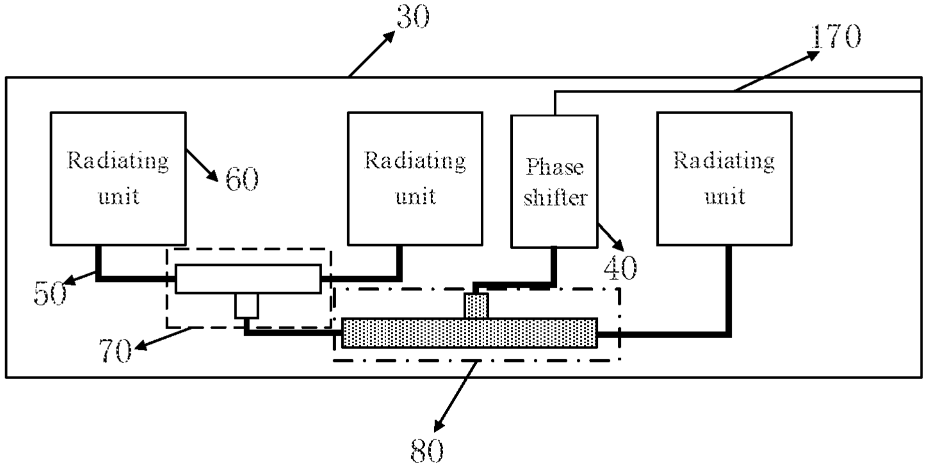
FIG. 10 is a schematic top view of a structure of an antenna sub-array of an adjustable antenna array according to an embodiment of the present disclosure.

In the embodiment of the present disclosure, as shown in FIG. 10, the number of the plurality of radiating units 60 is odd number, each pair of two radiating units 60 are respectively connected to the output ports 502 of one corresponding first-stage power division feeding network 70, and the remaining radiating unit 60 is connected to one output port 502 of one corresponding second-stage power division feeding network 80.

Still referring to FIG. 10, the sub-array is provided with three radiating units 60, one first-stage power division feeding network 70, and one second-stage power division feeding network 80. The first two adjacent radiating units 60 are connected to the output ports 502 of the first-stage power division feeding network 70, and the input port 501 of the first-stage power division feeding network 70 and the remaining radiating unit 60 are connected to the output ports 502 of the second-stage power division feeding network 80.

Still referring to FIG. 10, the sub-array includes three radiating units 60, one first-stage power division feeding network 70, one second-stage power division feeding network 80, and one phase shifter 40. The three radiating units 60 are arranged laterally in the same direction. The first two adjacent radiating units 60 are connected to the output ports 502 of the first-stage power division feeding network 70, and the input port 501 of the first-stage power division feeding network 70 and the remaining radiating unit 60 are connected to the output ports 502 of the second-stage power division feeding network 80. In one exemplary embodiment, the input port 501 of the first-stage power division feeding network 70 is electrically connected to one of the output ports 502 of the second-stage power division feeding network 80, and the remaining radiating units 60 is coupled to the other output port 502 of the second-stage power division feeding network 80. Furthermore, the input port 501 of the second-stage power division feeding network 80 is coupled to the phase shifter 40. In this way, a signal input to the input port 501 of the second-stage power division feeding network 80 by the phase shifter 40 is input to the corresponding radiating unit 60 and the input port 501 of the first-stage power division feeding network 70 through the two output ports 502 of the second-stage power division feeding network 80, respectively; then, the signal input to the input port 501 of the first-stage power division feeding network 70 is input to the corresponding two radiating units 60 through the two output ports 502 of the first-stage power division feeding network 70. Therefore, the layout space is saved, and the usability of the adjustable antenna array is ensured.

It should be noted that in the same antenna sub-array 30, a thickness of a control line 400 coupled to the phase shifter 40 may be smaller than a thickness of a metal layer corresponding to the phase shifter 40, the power division feeding network 50 and the feeding line 600, and the number of the control lines 400 depends on the number of the phase shifters 40. Generally, the number of the control lines 400 is consistent with (the same as) the number of the phase shifters 40, and the control lines 400 may provide driving signals to the corresponding phase shifters 40, thereby implementing adjustment of a phase shifting degree of the phase shifters 40. The control lines 400 may be made of indium tin oxide (ITO), which ensures the driving capability of the phase shifters while ensuring the light transmittance of the antenna sub-arrays 30.

Further, after the arrangement and driving form of the plurality of antenna sub-arrays 30 are determined, the plurality of antenna sub-arrays 30 may be arranged to form a desired array. For each antenna sub-array 30, M radiating units 60 may be laterally provided and N radiating units may be longitudinally provided, so that each antenna sub-array 30 includes Q radiating units 60, so as to form a large array including M×N antenna sub-arrays 30, that is, including M×N×Q radiating units 60. In addition, a plurality of different antenna sub-arrays 30 may be freely combined together to form various large arrays according to the practical requirements.

Figure 11:
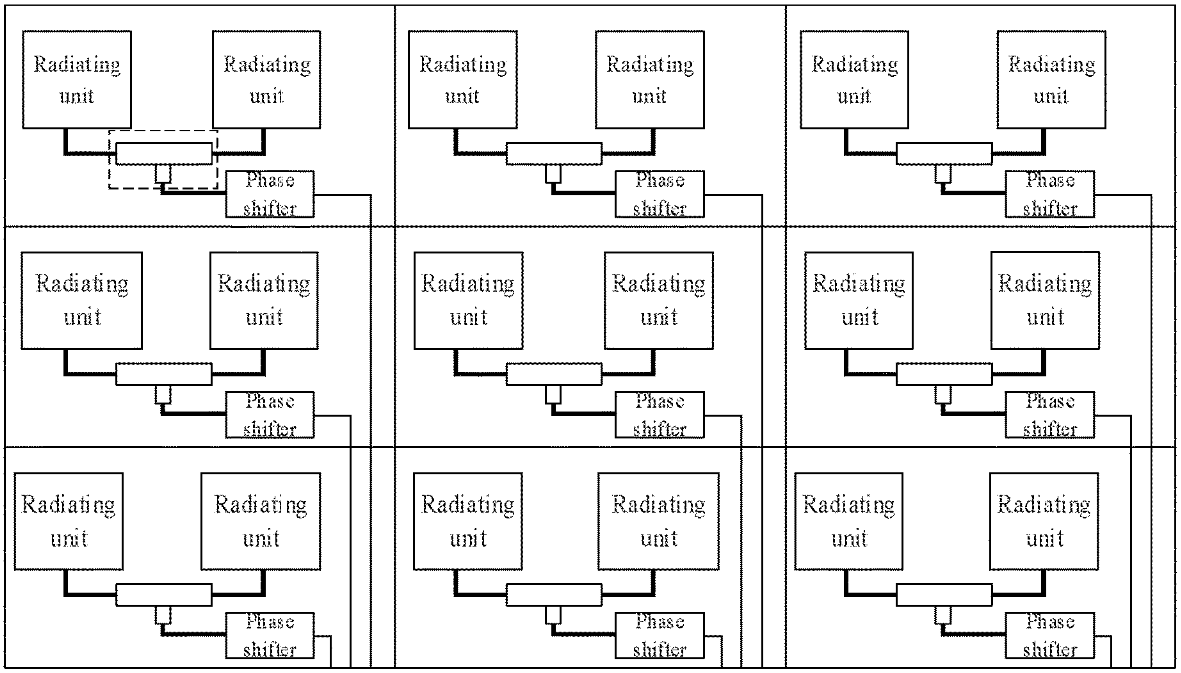
FIG. 11 is a schematic top view of a structure of an adjustable antenna array according to an embodiment of the present disclosure.

In one exemplary embodiment, the plurality of radiating units 60 are arranged side-by-side. FIG. 11 is a schematic top view of a structure of the array. In this embodiment, the array includes 3×3 antenna sub-arrays 30 arranged in an array. Each antenna sub-array 30 includes two radiating units 60 arranged side-by-side, and the array includes 3×3×2 radiating units 60.

Figure 12:
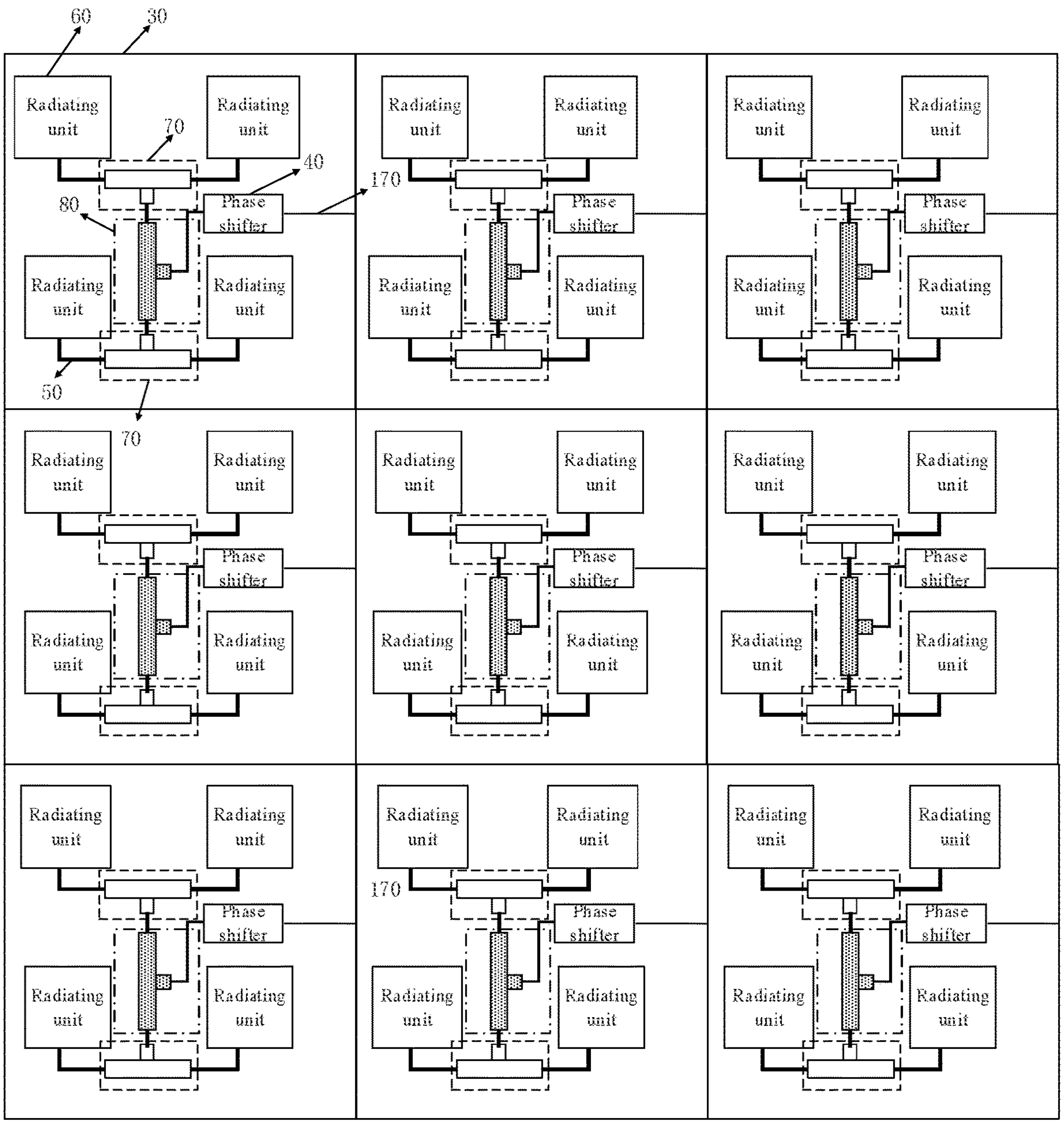
FIG. 12 is a schematic top view of a structure of an adjustable antenna array according to an embodiment of the present disclosure.

In one exemplary embodiment, the plurality of radiating units 60 are arranged in an array. FIG. 12 is a schematic top view of a structure of the array. In this embodiment, the array includes 3×3 antenna sub-arrays 30 arranged in an array. Each antenna sub-array 30 includes four radiating units 60 arranged in an array.

Figure 13:
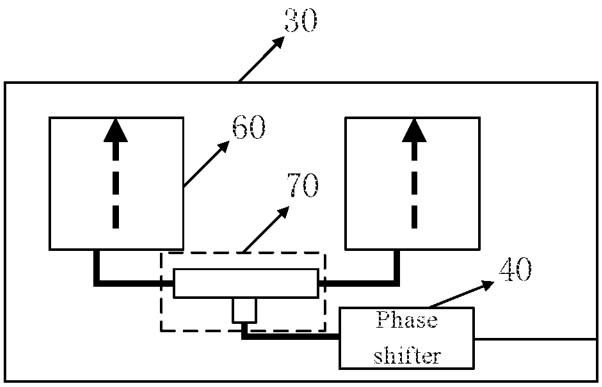
FIG. 13 is a schematic top view of a structure of an antenna sub-array of an adjustable antenna array according to an embodiment of the present disclosure.
Figure 14:
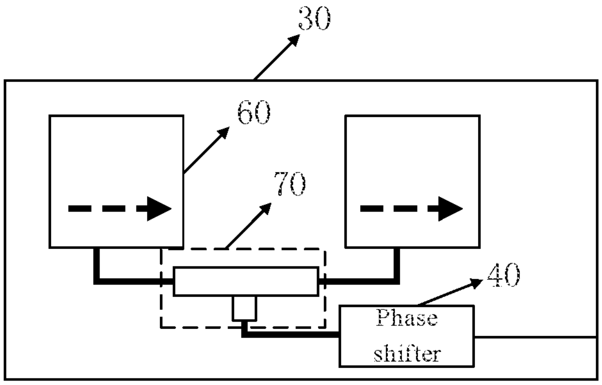
FIG. 14 is a schematic top view of a structure of an antenna sub-array of an adjustable antenna array according to an embodiment of the present disclosure.
Figure 15:
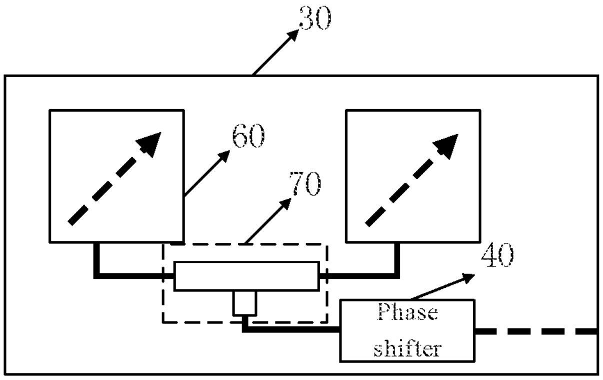
FIG. 15 is a schematic top view of a structure of an antenna sub-array of an adjustable antenna array according to an embodiment of the present disclosure.
Figure 16:
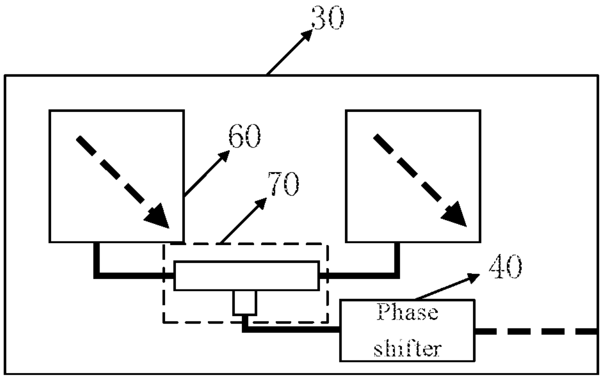
FIG. 16 is a schematic top view of a structure of an antenna sub-array of an adjustable antenna array according to an embodiment of the present disclosure.
Figure 17:
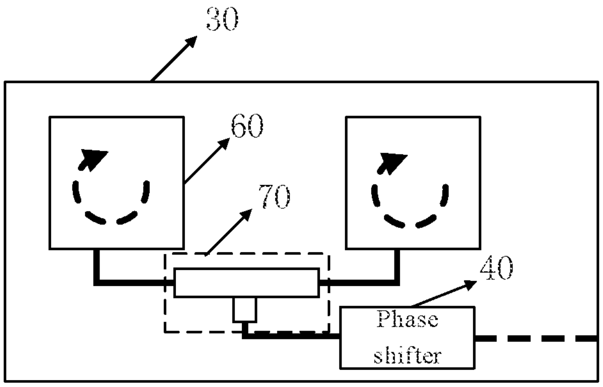
FIG. 17 is a schematic top view of a structure of an antenna sub-array of an adjustable antenna array according to an embodiment of the present disclosure.
Figure 18:
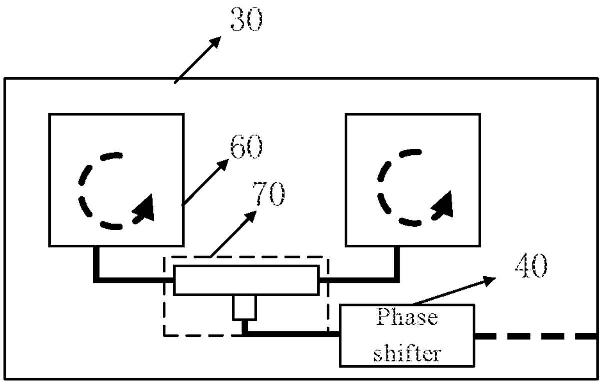
FIG. 18 is a schematic top view of a structure of an antenna sub-array of an adjustable antenna array according to an embodiment of the present disclosure.

Alternatively, besides the above arrangements of the array, the sub-arrays in the array and the radiating units 60 in each antenna sub-array 30 may be arranged according to the practical requirements, which is not described in detail herein. In the embodiment of the present disclosure, the radiating units 60 forming the antenna sub-arrays 30 and the array may have a variety of polarizations. In one exemplary embodiment, as shown in FIGS. 13 to 18, the radiating units 60 are single-polarized structures with the same polarization direction, and each single-polarized structure has any one of vertical polarization, horizontal polarization, +45° polarization, −45° polarization, right-hand circular polarization and left-hand circular polarization. By taking one antenna sub-array 30 as an example, FIG. 13 is a schematic diagram of a structure in which each of the two radiating units 60 in the sub-array has the vertical polarization; FIG. 14 is a schematic diagram of a structure in which each of the two radiating units 60 in the sub-array has the horizontal polarization; FIG. 15 is a schematic diagram of a structure in which each of the two radiating units 60 in the sub-array has the +45° polarization; FIG. 16 is a schematic diagram of a structure in which each of the two radiating units 60 in the sub-array has the −45° polarization; FIG. 17 is a schematic diagram of a structure in which each of the two radiating units 60 in the sub-array has the right-hand circular polarization; FIG. 18 is a schematic diagram of a structure in which each of the two radiating units 60 in the sub-array has the left-hand circular polarization. The arrows in the drawings indicate polarization directions of the respective radiating units 60.

Figure 19:
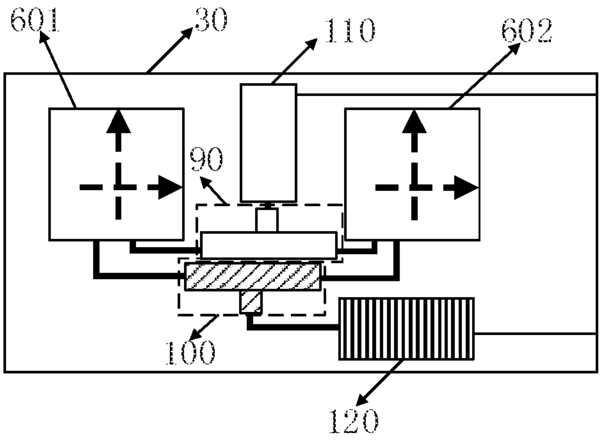
FIG. 19 is a schematic top view of a structure of an antenna sub-array of an adjustable antenna array according to an embodiment of the present disclosure.
Figure 20:
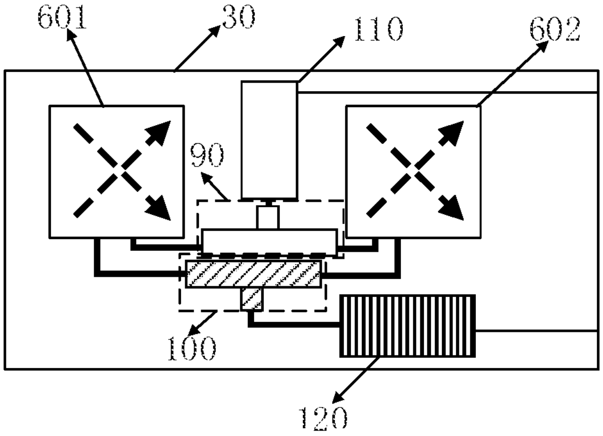
FIG. 20 is a schematic top view of a structure of an antenna sub-array of an adjustable antenna array according to an embodiment of the present disclosure.
Figure 21:
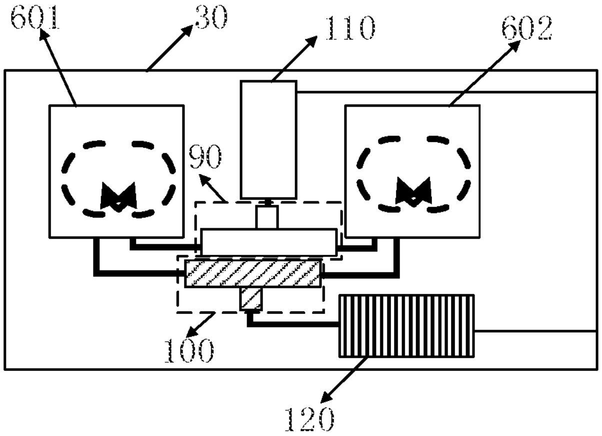
FIG. 21 is a schematic top view of a structure of an antenna sub-array of an adjustable antenna array according to an embodiment of the present disclosure.

In an exemplary embodiment, by taking one antenna sub-array 30 as an example, as shown in FIGS. 19 to 21, each of the radiating units 60 is a dual-polarization structure having two different polarization directions, and the dual-polarization structure includes any one of vertical-horizontal dual-polarization, ±45° dual-polarization, and left-right circular dual-polarization. FIG. 19 is a schematic diagram of a structure in which each of the two radiating units 60 in the sub-array has the vertical-horizontal dual-polarization; FIG. 20 is a schematic diagram of a structure in which each of the two radiating units 60 in the sub-array has the ±45° dual-polarization; FIG. 21 is a schematic diagram of a structure in which each of the two radiating units 60 in the sub-array has the left-right circular dual-polarization.

In a specific implementation, each radiating unit 60 in the adjustable antenna array is a dual-polarization structure including two different polarization directions. In one exemplary embodiment, the plurality of radiating units 60 includes a first radiating unit 601 and a second radiating unit 602, the power division feeding network 50 includes a first power division feeding network 90 and a second power division feeding network 100, the phase shifter 40 includes a first phase shifter 110 and a second phase shifter 120. Output ports 502 of the first power division feeding network 90 are connected to the first radiating unit 601 and the second radiating unit 602, respectively, an input port 501 of the first power division feeding network 90 is connected to the first phase shifter 110 through a first feeding line 130; output ports 502 of the second power division feeding network 100 are connected to the first radiating unit 601 and the second radiating unit 602, respectively, and an input port 501 of the second power division feeding network 100 is connected to the second phase shifter 120 through a second feeding line 140.

In one exemplary embodiment, the input port 501 of the first power division feeding network 90 is electrically connected to the first phase shifter 110 through the first feeding line 130, and the input port 501 of the second power division feeding network 100 is electrically connected to the second phase shifter 120 through the second feeding line 140. In one exemplary embodiment, the input port 501 of the first power division feeding network 90 is coupled to the first phase shifter 110 through the first feeding line 130, and the input port 501 of the second power division feeding network 100 is coupled to the second phase shifter 120 through the second feeding line 140. In one exemplary embodiment, the input port 501 of the first power division feeding network 90 is coupled to the first phase shifter 110 through the first feeding line 130, and the input port 501 of the second power division feeding network 100 is electrically connected to the second phase shifter 120 through the second feeding line 140. Alternatively, the connection between the power division feeding network and the corresponding phase shifter may be set according to the practical requirements, which is not limited herein.

Still referring to FIG. 19 to FIG. 21, each antenna sub-array 30 in the adjustable antenna array includes two radiating units including the first radiating unit 601 and the second radiating unit 602, two power division feeding networks including the first power division feeding network 90 and the second power division feeding network 100, and two phase shifters including the first phase shifter 110 and the second phase shifter 120. A coupling relationship among the units in the sub-array may be that the output ports 502 of the first power division feeding network 90 are coupled to the first radiating unit 601 and the second radiating unit 602 respectively, and the input port 501 of the first power division feeding network 90 may be connected to the first phase shifter 110 through the first feeding line 130, the output ports 502 of the second power division feeding network 100 may be coupled to the first radiating unit 601 and the second radiating unit 602 respectively, and the input port 501 of the second power division feeding network 100 is connected to the second phase shifter 120 through the second feeding line 140. Therefore, even if the sub-array is composed of the dual-polarization structure, the whole sub-array only needs two power division feeding networks and two phase shifters, and therefore the layout space is saved.

Figure 22:
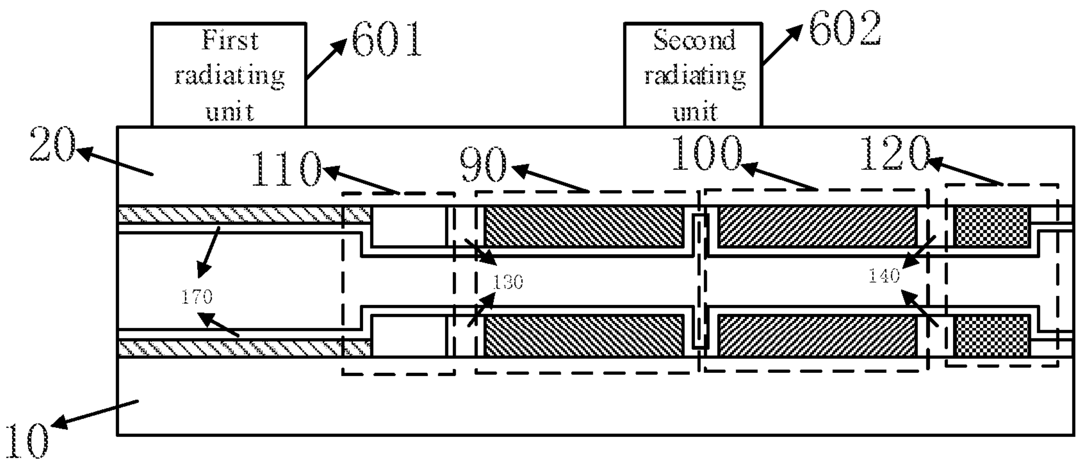
FIG. 22 is a schematic cross-sectional view of any one of the structures of FIGS. 19 to 21.
Figure 23:
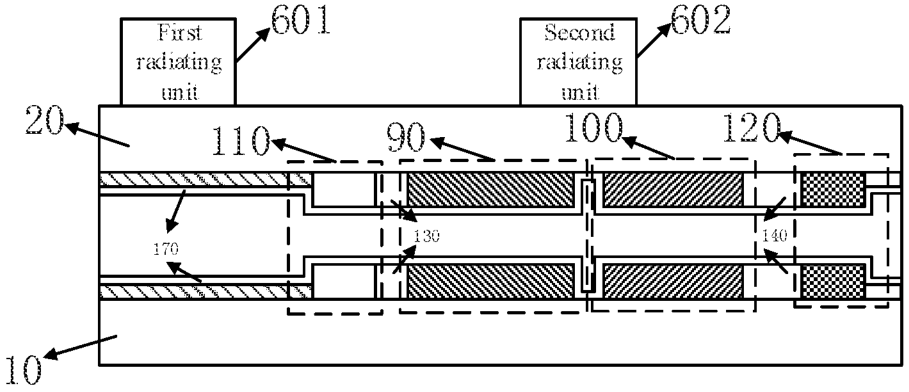
FIG. 23 is a schematic cross-sectional view of any one of the structures of FIGS. 19 to 21.

Still taking the embodiments shown in FIG. 19 to FIG. 21 as examples, the first phase shifter 110, the first feeding line 130, the first power division feeding network 90, the second phase shifter 120, the second feeding line 140, and the second power division feeding network 100 are formed by patterns of metal layers on the same substrate in the same layer and having the same thickness. A material of the metal layer may be copper (Cu), silver (Ag) or aluminum (Al) or the like. Therefore, the manufacturing cost of the sub-arrays is reduced, and the manufacturing efficiency of the adjustable antenna array is improved. FIG. 22 is a schematic cross-sectional view of any one of the structures of FIGS. 19 to 21. FIG. 23 is a schematic cross-sectional view of any one of the structures of FIGS. 19 to 21. In one exemplary embodiment, as shown in FIG. 22, the units coupled to the first radiating unit 601 and the units coupled to the second radiating unit 602 are symmetrically arranged in structure. Accordingly, the first phase shifter 110 and the second phase shifter 120 have the same structural parameters including the line width and the line length; the first feeding line 130 and the second feeding line 140 have the same structural parameters including the line width and the line length on the same substrate; the first power division feeding network 90 and the second power division feeding network 100 have the same structural parameters including the line width and the line length on the same substrate.

In one exemplary embodiment, as shown in FIG. 23, the units coupled to the first radiating unit 601 and the units coupled to the second radiating unit 602 are asymmetrically arranged in structure. Accordingly, the structural parameters of the units with the same performance corresponding to each radiating unit may be different. For example, the first feeding line 130 and the second feeding line 140 have different structural parameters including the line width and the line length on the same substrate. As shown in FIG. 23, the line width of the first feeding line 130 is smaller than the line width of the second feeding line 140.

Figure 24:
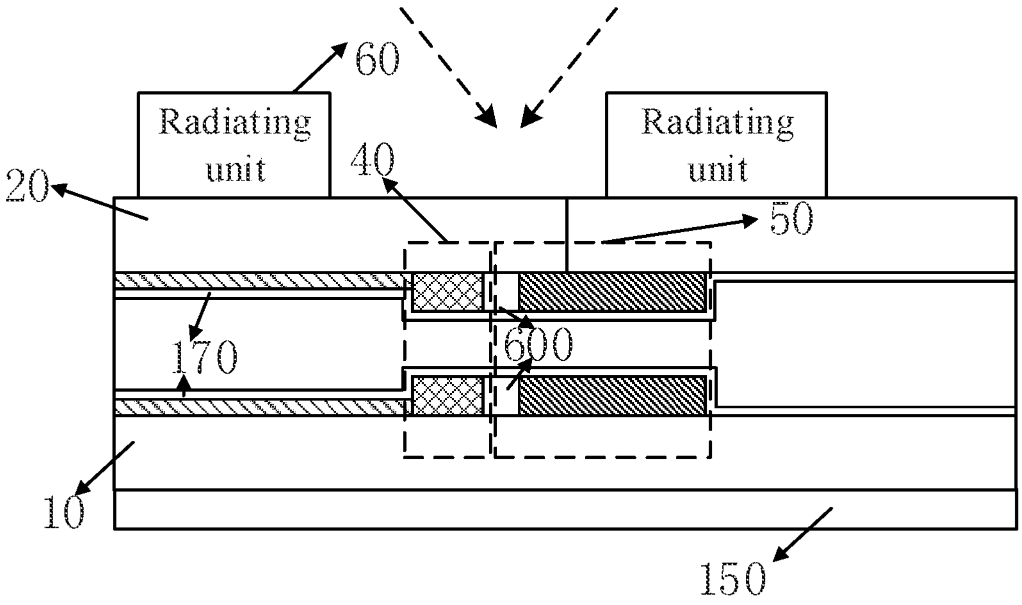
FIG. 24 is a schematic cross-sectional view of a structure of an adjustable antenna array as a reflective antenna array according to an embodiment of the present disclosure.

In one exemplary embodiment, as shown in FIG. 24, the adjustable antenna array provided by the embodiment of the present disclosure may be a reflective antenna array. Specifically, the adjustable antenna array further includes a ground electrode 150 located on a side of the first substrate 10 away from the second substrate 20, and an orthographic projection of each of the radiating units on the first substrate 10 completely falls within an orthographic projection of the ground electrode 150 on the first substrate 10, so that an electromagnetic wave signal received by the adjustable antenna array on a side of the second substrate 20 away from the first substrate 10 is reflected from the same side by the ground electrode 150. Still referring to FIG. 24, an electromagnetic wave signal received by the adjustable antenna array on the side of the second substrate 20 away from the first substrate 10 will be reflected from the same side due to the ground electrode 150 located at the side of the first substrate 10 away from the second substrate 20, wherein the direction of the arrow indicates a propagation direction of the electromagnetic wave signal. Therefore, the propagation direction of the electromagnetic wave signal may be adjusted according to the practical requirements, and the usability of the adjustable antenna array is improved.

Figure 25:
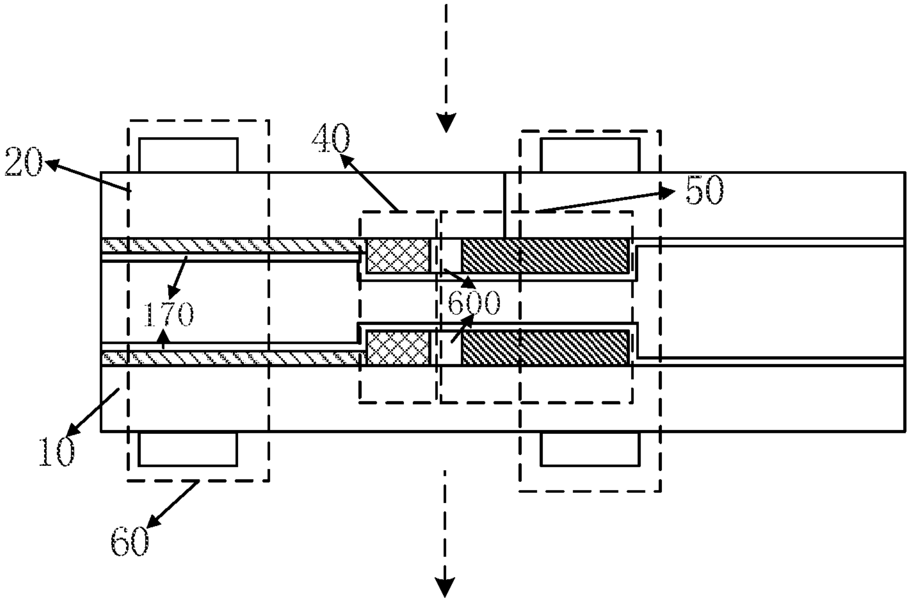
FIG. 25 is a schematic cross-sectional view of a structure of an adjustable antenna array as a transmissive antenna array according to an embodiment of the present disclosure.

In one exemplary embodiment, the adjustable antenna array provided by the embodiment of the present disclosure may be a transmissive antenna array. Specifically, the antenna patterns further include another pattern on a side of the first substrate 10 away from the second substrate 20, and orthographic projections of the another pattern and the pattern on the first substrate 10 at least partially overlap with each other, so that an electromagnetic wave signal received by the adjustable antenna array on a side of the second substrate 20 away from the first substrate 10 is transmitted through a side of the first substrate 10 away from the second substrate 20. In a specific implementation, the antenna patterns further include another pattern on a side of the first substrate 10 away from the second substrate 20, and orthographic projections of the another pattern and the pattern on a side of the second substrate 20 away from the first substrate 10 on the first substrate 10 at least partially overlap with each other. FIG. 25 is a schematic cross-sectional view of a structure of an adjustable antenna array provided in an embodiment of the present disclosure, where the orthographic projections of the another pattern and the pattern of the antenna patterns on the first substrate 10 completely overlap with each other, and a direction indicated by an arrow in FIG. 25 represents a propagation direction of an electromagnetic wave signal. In this way, the electromagnetic wave signal received by the adjustable antenna array on the side of the second substrate 20 away from the first substrate 10 may be transmitted through the side of the first substrate 10 away from the second substrate 20, thereby ensuring the transmission performance of the adjustable antenna array.

Alternatively, the adjustable antenna array may be an adjustable phased array antenna array besides the reflective antenna array and the transmissive antenna array. Alternatively, other ways may be selected to provide the adjustable antenna array according to the practical requirements, which is not limited herein.

It should be noted that the phase shifter in the adjustable antenna array includes a plurality of phase shifting units that do not overlap with each other on the same substrate, and each phase shifting unit includes a first electrode disposed on a side of the first substrate 10 close to the second substrate 20, a second electrode disposed on a side of the second substrate 20 close to the first substrate 10, and an interlayer dielectric layer 160 located between the first electrode and the second electrode. Materials of the first electrode and the second electrode may be the same or different. For example, the material of the first electrode may be indium tin oxide (ITO), copper (Cu), silver (Ag), or the like, and the material of the second electrode may be indium tin oxide (ITO), copper (Cu), silver (Ag), or the like. Different materials have different conductivity and different loss. In practical applications, the materials of the first electrode and the second electrode may be selected according to the practical requirements for the phase shifting degree of the phase shifter 40, which is not limited herein. In one exemplary embodiment, the interlayer dielectric layer 160 may be a liquid crystal layer and the phase shifter 40 is correspondingly a liquid crystal phase shifter. Liquid crystal molecules in the liquid crystal layer may be positive liquid crystal molecules, or negative liquid crystal molecules, which is not limited herein. In addition, insulating layers 170 are disposed on a side of the interlayer dielectric layer 160 close to the first substrate 10 and on a side of the interlayer dielectric layer 160 close to the second substrate 20, and may be made of SiN or SiO, which is not limited herein, so as to effectively avoid the erosion of external water and oxygen to the layers in the adjustable antenna array, and improve the usability of the adjustable antenna array.

In addition, in the case where the interlayer dielectric layer 160 in the phase shifter 40 is the liquid crystal layer, the liquid crystal molecules in the liquid crystal layer may be tilted at a predetermined angle by providing an alignment layer in advance. In this way, after driving voltages are applied to the corresponding electrodes through the control lines 400, the adjustment efficiency of the dielectric constant of the liquid crystal layer is improved, thereby improving the phase shifting efficiency. Alternatively, other layers of the adjustable antenna array may be disposed according to the practical requirements, and specific reference may be made to specific technologies in the related art, which will not be described in detail herein.

Figure 26:
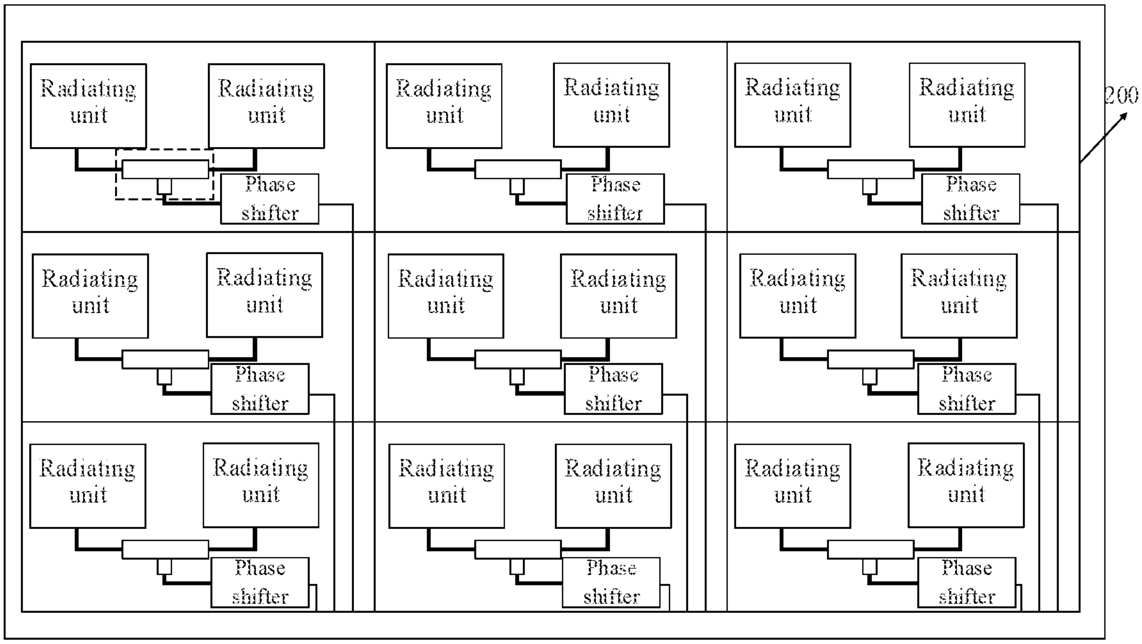
FIG. 26 is a schematic diagram of a structure of an electronic apparatus according to an embodiment of the present disclosure.

Based on the same concept of the present disclosure, as shown in FIG. 26, an embodiment of the present disclosure further provides an electronic apparatus, including:

The adjustable antenna array 200 as described in any one of the above embodiments.

While the preferred embodiments of the present disclosure have been described, additional variations and modifications in these embodiments may occur to a person skilled in the art once they learn of the basic inventive concepts. Therefore, it is intended that the appended claims are interpreted as including the preferred embodiment and all changes and modifications that fall within the scope of the present disclosure.

It will be apparent to a person skilled in the art that various changes and modifications may be made to the present disclosure without departing from the spirit and scope of the present disclosure. Thus, it is intended that the present disclosure also encompasses such changes and modifications if such changes and modifications of the present disclosure fall within the scope of the claims and their equivalents.

What is claimed is:

1. An adjustable antenna array, comprising:

a first substrate and a second substrate opposite to each other, and a plurality of antenna sub-arrays;

wherein each of at least some of the plurality of antenna sub-arrays comprises a phase shifter, a power division feeding network, and a plurality of radiating units, the phase shifter and the power division feeding network are between the first substrate and the second substrate, at least some of the plurality of radiating units are connected to the phase shifter through the power division feeding network, an antenna pattern corresponding to the plurality of radiating units at least comprises a partial pattern on a side of the second substrate away from the first substrate;

wherein the power division feeding network comprises a first-stage power division feeding network and a second-stage power division feeding network, output ports of the first-stage power division feeding network are connected to the plurality of radiating units, an input port of the first-stage power division feeding network is connected to one output port of the second-stage power division feeding network, and an input port of the second-stage power division feeding network is connected to the phase shifter.

2. The antenna array of claim 1, wherein an input port of the power division feeding network is connected to the phase shifter, and a plurality of output ports of the power division feeding network are in one-to-one correspondence with the corresponding radiating units.

3. The antenna array of claim 2, wherein the plurality of output ports in each power division feeding network have a same line length and a same line width.

4. The antenna array of claim 1, wherein the adjustable antenna array comprises three or more radiating units, two or more power division feeding networks, and the number of output ports of each of the two or more power division feeding networks is less than the number of plurality of radiating units.

5. The antenna array of claim 3, wherein the two or more power division feeding networks have a same number of output ports.

6. The antenna array of claim 1, wherein the first-stage power division feeding network comprises two output ports and the second-stage power division feeding network comprises two output ports.

7. The antenna array of claim 6, wherein the number of the plurality of radiating units is even-numbered, and every two radiating units are connected to the output ports of one corresponding first-stage power division feeding network, respectively.

8. The antenna array of claim 7, wherein the plurality of radiating units comprise four radiating units, and the power division feeding network comprises two first-stage power division feeding networks and one second-stage power division feeding network; and two adjacent radiating units are respectively connected to the output ports of one first-stage power division feeding network, and the other two adjacent radiating units are respectively connected to the output ports of the other first-stage power division feeding network, and the input ports of the two first-stage power division feeding networks are respectively connected to the output ports of the second-stage power division feeding network.

9. The antenna array of claim 7, wherein the plurality of radiating units comprise four radiating units, and the power division feeding network comprises one first-stage power division feeding network and one second-stage power division feeding network; and the first two adjacent radiating units are respectively connected to the output ports of the first-stage power division feeding network, the input port of the first-stage power division feeding network and one of the other two radiating units are connected to the output ports of the second-stage power division feeding network, and the other one of the other two radiating units is directly connected to the other phase shifter.

10. The antenna array of claim 6, wherein the number of the plurality of radiating units is odd-numbered, each pair of two radiating units are respectively connected to the output ports of one corresponding first-stage power division feeding network, and one remaining radiating unit is connected to one output port of one corresponding second-stage power division feeding network.

11. The antenna array of claim 10, wherein the plurality of radiating units comprise three radiating units, and the power division feeding network comprises one first-stage power division feeding network and one second-stage power division feeding network; and two adjacent radiating units are connected to the output ports of the first-stage power division feeding network, respectively, and the input port of the first-stage power division feeding network and the remaining radiating unit are connected to the output ports of the second-stage power division feeding network.

12. The antenna array of claim 1, wherein the plurality of radiating units are arranged side-by-side.

13. The antenna array of claim 1, wherein the plurality of radiating units are single-polarized structures with a same polarization direction, and each single-polarized structure comprises any one of vertical polarization, horizontal polarization, +45° polarization, −45° polarization, right-hand circular polarization and left-hand circular polarization.

14. The antenna array of claim 1, wherein each radiating unit is a dual-polarization structure having two different polarization directions, and the dual-polarization structure comprises any one of vertical-horizontal dual-polarization, ±45° dual-polarization, and left-right circular dual-polarization.

15. The antenna array of claim 14, wherein the plurality of radiating units comprises a first radiating unit and a second radiating unit, the power division feeding network comprises a first power division feeding network and a second power division feeding network, the phase shifter comprises a first phase shifter and a second phase shifter, output ports of the first power division feeding network are connected to the first radiating unit and the second radiating unit, respectively, an input port of the first power division feeding network is connected to the first phase shifter through a first feeding line, output ports of the second power division feeding network are connected to the first radiating unit and the second radiating unit, respectively, and an input port of the second power division feeding network is connected to the second phase shifter through a second feeding line.

16. The antenna array of claim 15, wherein the first phase shifter, the first feeding line, the first power division feeding network, the second phase shifter, the second feeding line, and the second power division feeding network are formed by patterns of metal layers on a same substrate in a same layer and having a same thickness.

17. The antenna array of claim 1, further comprising a ground electrode on a side of the first substrate away from the second substrate, and an orthographic projection of each radiating unit on the first substrate completely falls within an orthographic projection of the ground electrode on the first substrate, so that an electromagnetic wave signal received by the adjustable antenna array on the side of the second substrate away from the first substrate is reflected from the same side of the second substrate away from the first substrate by the ground electrode.

18. The antenna array of claim 1, wherein the antenna pattern further comprise another partial pattern on a side of the first substrate away from the second substrate, and orthographic projections of the another partial pattern and the partial pattern on the first substrate at least partially overlap with each other, so that an electromagnetic wave signal received by the adjustable antenna array on the side of the second substrate away from the first substrate is transmitted through the side of the first substrate away from the second substrate.

19. An electronic apparatus, comprising: the adjustable antenna array of claim 1.

* * * * *